W. BACHMANN.
BROODER.
APPLICATION FILED APR. 9, 1909.
950,831.
Patented Mar. 1, 1910.
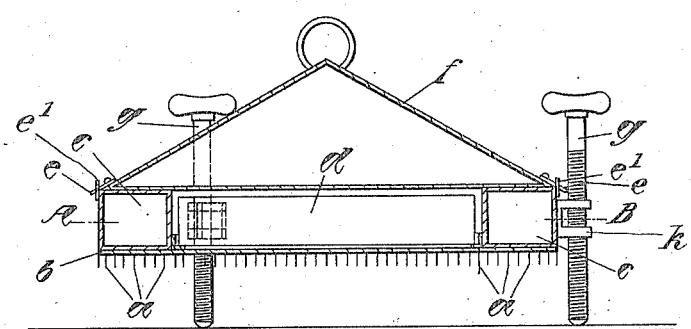
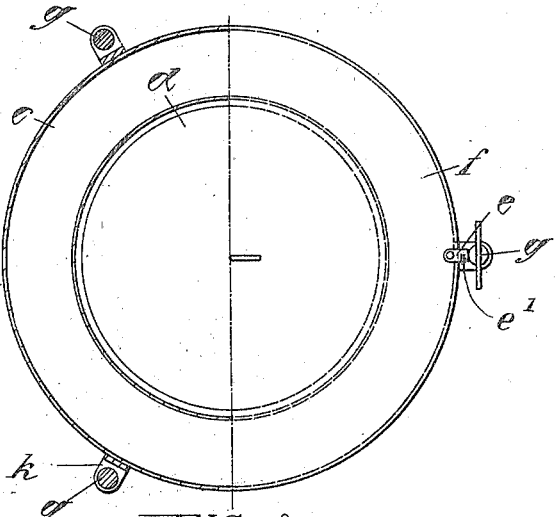
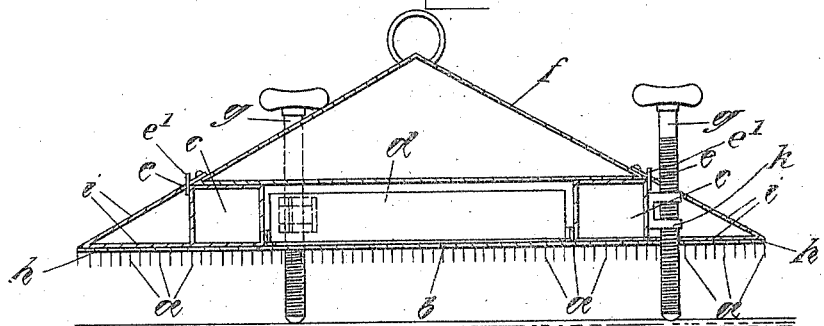
Witnesses:
Inventor:
Walter Bachmann
by Arthur E. Gump Atty.

UNITED STATES PATENT OFFICE.

WALTER BACHMANN, OF LANGENGROBSDORF, NEAR GERA, GERMANY.

BROODER.

950,831.　　　　　Specification of Letters Patent.　　Patented Mar. 1, 1910.

Application filed April 9, 1909. Serial No. 489,023.

*To all whom it may concern:*

Be it known that I, WALTER BACHMANN, a subject of the German Emperor, residing at Langengrobsdorf, near Gera, Reuss, Germany, have invented new and useful Improvements in Brooders, of which the following is a specification.

For raising chickens bred by means of a breeding machine there are, as is known, contrivances in use which contain an artificial source of warmth and, as a consequence, are to form a substitute for the natural warmth of the clucking-hen's body. These contrivances, however, do not fully answer their purpose inasmuch as the radiation of warmth is mostly effected from one point, so that the chickens strive toward reaching this point and thereby press each other to death, or the warming is done from beneath and this is detrimental to the development of the animals as it needs the upper warmth to perfect wings and feathers. Moreover these breeding apparatuses are closed by curtains toward their outsides so that the chickens are constantly breathing in air contaminated by their own respiration thus coming to an end aside from the fact that animals which are protected against every draft of fresh air are weakened and accordingly little capable of resistance to diseases etc.

Contrary thereto the invention has the advantage that it forms a contrivance for raising chickens which is strictly in accordance with nature, so that the chickens are growing up in a manner as if raised by a clucking-hen.

The brooder consists in the main in a suitable circular plate covered on the underside with a woolen or similar bolster, is resting a thermaphore or an apparatus for transferring warmth, which can easily be removed after taking off a circular cap covering the whole contrivance. The insulating ring provided with double walls is supported by three adjusting-screws and admits according to wants both a lifting and a sinking which is necessary because the contrivance must always be so arranged as to enable the chickens to touch the wool-bolster with the back. To give further due attention to the growth of the animals there is arranged at the underside a special ring likewise provided with a bolster, which is connected with the raising-contrivance so that the flat side of the bolster experiences an enlargement.

The warming effected from above by a thermaphore, already in use with breeding-machines, is, because of the arrangement of the woolen or a similar bolster of an even character, so that the chickens do not closely press themselves together and suffer thereby. On the contrary, they approach each other in such a manner as they are wonted to do beneath the feathers of the clucking-hen. Moreover, the animals are constantly breathing in fresh air thus getting hardened, so that a weaning becomes superfluous.

In the accompanying drawing: Figure 1 is a vertical central section through a brooder embodying my invention; Fig. 2 a horizontal section, partly in plan view, on line A—B, Fig. 1, and Fig. 3 a section similar to Fig. 1, showing the brooder provided with a circumferential enlargement.

The plate C provided with a woolen or similar bolster $a$ is affixed to the circular hollow body $c$ serving as insulator which surrounds the thermaphore or heater $d$ composed of metal or the like and filled for example, as is known, with acetic natron and is covered by a conical cap or cover $f$. The latter is removably secured to ring $c$ by means of hooks $e$ pivoted to the cover, and adapted to engage keepers $e^1$ secured to the ring. The brooder is supported by a number of vertical screws tapped into brackets $k$ of ring $c$. By properly adjusting screws $g$, the distance of bottom plate $b$ from the supporting ground may be readily varied in conformity with the size of the chickens.

The second form of the brooder (Fig. 3) differs from the form given in Figs. 1 and 2 only in so far as in this case a circular ring $h$ likewise bolstered at the under-side is arranged in order to broaden plate C. This circular ring rests by means of rim $i$ on the cap $f$, while the inner edge of its annular bottom plate encompasses hollow body $c$, so that ring $h$ is securely held in place.

The thermaphore, capable of being easily taken out, is heated in boiling water until the acetic natron is fully melted and, because of the latent warmth taken up, remains subsequently hot for a long time, so that a continual even temperature prevails under bolster $a$.

The chicken which, following their natural instinct, press toward the bolster with the back are as a consequence so warmed as if sitting beneath a clucking-hen and are nevertheless not excluded from the fresh air, so that they are developing in a normal way and their mortality is very limited. After the chickens are sufficiently developed the warming of the brooder by thermaphore is done away with in as much as their bodily warmth in connection with the woolen or similar bolster is then sufficient to keep the chickens in a sound condition.

I claim—

A brooder, comprising a bottom plate, a heater resting thereon, a bolster secured to the lower side of said bottom plate, an annular insulator encircling the heater, a removable cover above said heater and insulator, a hollow ring encircling the insulator and having a lower bolstered side flush with the bottom plate, and means for adjusting the distance of said bottom plate from the supporting ground.

In testimony whereof I affix my signature.

WALTER BACHMANN.

In the presence of—
  J. HENNAN,
  CHARLES NEURR.